US012792671B2

(12) United States Patent
Nanal et al.

(10) Patent No.: US 12,792,671 B2
(45) Date of Patent: Nov. 10, 2026

(54) DOCUMENT MANAGEMENT SYSTEM

(71) Applicant: Boost SubscriberCo L.L.C., Englewood, CO (US)

(72) Inventors: Hrushikesh Shrikant Nanal, Littleton, CO (US); Levi Eichelberg, Highlands Ranch, CO (US); Barbara Perez Mendez, Parker, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 0 days.

(21) Appl. No.: 19/039,030

(22) Filed: Jan. 28, 2025

(65) Prior Publication Data

US 2026/0220209 A1 Jul. 30, 2026

(51) Int. Cl.

*G06F 16/93* (2019.01)
*G06F 16/901* (2019.01)
*G06F 16/903* (2019.01)
*G06F 16/906* (2019.01)
*G06F 40/279* (2020.01)
*G06Q 30/0601* (2023.01)

(52) U.S. Cl.

CPC ............ *G06F 16/93* (2019.01); *G06F 16/901* (2019.01); *G06F 16/90335* (2019.01); *G06F 16/906* (2019.01); *G06F 40/279* (2020.01); *G06Q 30/0611* (2013.01)

(58) Field of Classification Search

CPC .. G06F 16/93; G06F 16/901; G06F 16/90335; G06F 16/906; G06F 40/279; G06Q 30/0611

See application file for complete search history.

(56) References Cited

U.S. PATENT DOCUMENTS 7,996,393 B1 * 8/2011 Nanno .................. G06F 16/353 707/723
2017/0237868 A1 * 8/2017 Sato ..................... G06V 30/416 358/402
2020/0099530 A1 * 3/2020 Khatib .................... G06F 18/24
2022/0171777 A1 * 6/2022 Gowda ................... G06F 40/30

* cited by examiner

*Primary Examiner* — Charles Rones
*Assistant Examiner* — Xiaoqin Hu
(74) *Attorney, Agent, or Firm* — Lowenstein Sandler LLP

(57) ABSTRACT

Technologies for managing documents and related document data are described. The document management system assigns a document identifier to an electronic file received from a user system. Using a first machine learning (ML) model, a set of keywords associated with the electronic file are extracted. Using a second ML model, a set of category mappings are generated, where each category mapping includes an association between each keyword of the set of keywords and a corresponding category of a set of categories. A set of entries associated with the electronic file are stored in a database, where each entry of the set of entries comprises the document identifier and a category mapping of the set of category mappings.

17 Claims, 7 Drawing Sheets

410

| Document Identifier | Extracted Keyword(s) | Category Mapping | Index Value |
|---|---|---|---|
| Document 123 | Keyword 1<br>Keyword 2<br>Keyword N | Category A<br>Category A<br>Category C | Index value 1<br>Index value 2<br>Index value N |
| Document 456 | Keyword 2<br>Keyword 8<br>Keyword P | Category B<br>Category C<br>Category A | Index value N+1<br>Index value N+2<br>Index value N+P |
| ⋮ | ⋮ | ⋮ | ⋮ |
| Document XYZ | Keyword 1<br>Keyword 3<br>Keyword Q | Category C<br>Category C<br>Category B | Index value N+P+1<br>Index value N+P+2<br>Index value N+P+Q |

FIG. 4

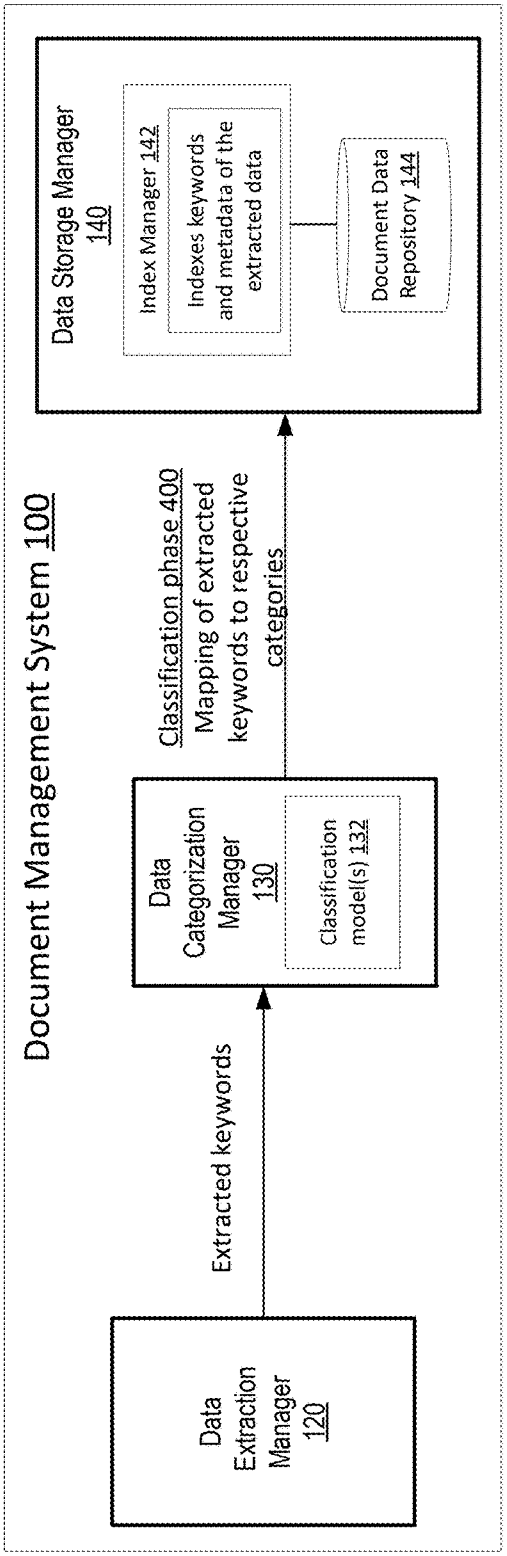

410

| Document Identifier | Extracted Keyword(s) | Category Mapping | Index Value |
|---|---|---|---|
| Document 123 | Keyword 1<br>Keyword 2<br>Keyword N | Category A<br>Category A<br>Category C | Index value 1<br>Index value 2<br>Index value N |
| Document 456 | Keyword 2<br>Keyword 8<br>Keyword P | Category B<br>Category C<br>Category A | Index value N+1<br>Index value N+2<br>Index value N+P |
| ⋮ | ⋮ | ⋮ | ⋮ |
| Document XYZ | Keyword 1<br>Keyword 3<br>Keyword Q | Category C<br>Category C<br>Category B | Index value N+P+1<br>Index value N+P+2<br>Index value N+P+Q |

DOCUMENT MANAGEMENT SYSTEM

BACKGROUND

Procurement and contract management in a corporation typically requires a manual process of sourcing quotes, comparing multiple vendors, and negotiating discounts for a large volume of individual contracts. The process involves a meticulous review of documents, interaction with numerous vendors, and careful selection of the most favorable options for each contract. Vendor management is an ongoing process which is required during the establishing of new contractual agreements as well as existing contracts. To effectively manage procurement and contract management tasks, individuals frequently need to refer to executed documents (e.g., existing contracts, responses to requests for proposals, etc.) to extract relevant data.

Many existing vendor management processes require a team within a company to manually review a large number of documents that are stored in a system (e.g., search for quotes, evaluate terms and conditions, comparing vendor offerings or proposals, negotiate contracts, coordinate with various other teams within the company, gather pertinent data, etc.) and provide feedback relating to those documents. For example, the vendor management team may be required to manually summarize and analyze each individual document and engage in several back-and-forth communications in an effort to optimize the outcomes for the involved parties.

This approach of manually sourcing quotes, comparing vendor options, and negotiating discounts for a large number of contracts is extremely labor-intensive and time-consuming. It necessitates handling numerous documents, contacting multiple vendors, and meticulously assessing each offer to secure the most advantageous deal for each contract. This process is prone to inefficiencies and human error. Furthermore, proprietary and confidential information may be vulnerable due to the use of external support to perform tasks such as mass metadata extraction.

BRIEF DESCRIPTION OF THE SEVERAL VIEWS OF THE DRAWINGS

The present disclosure is illustrated by way of example, and not by way of limitation, in the figures of the accompanying drawings.

FIG. 4 depicts example data extraction manager, an example categorization manager, and an example data storage manager of a document management system and an example data structure including database entries associated with multiple document files, according to one or more embodiments.

DETAILED DESCRIPTION

Figure 1:
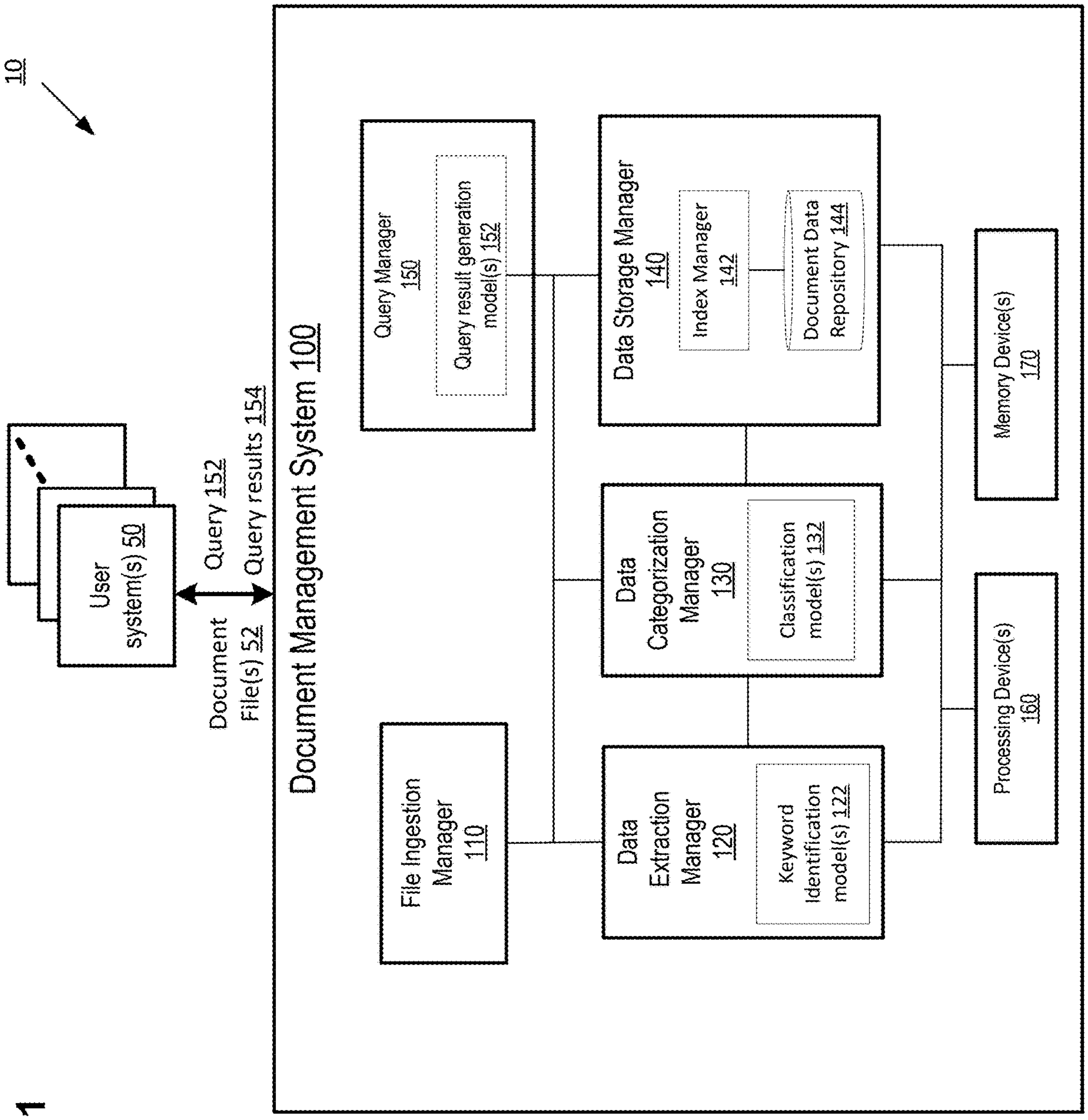
FIG. 1 is a block diagram of a document management system to manage electronic document files, according to one or more embodiments.

Technologies for managing documents and document content and data associated with sourcing and vendor management, financial planning, analysis, budgeting, purchasing, and supply chain management, are described. The following description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely exemplary. Particular implementations may vary from these exemplary details and still be contemplated to be within the scope of the present disclosure.

An entity (e.g., a corporation) may maintain a large number of procurement-related arrangements with various different suppliers or vendors to support the entity's many different business units. Management of the various vendors requires the review and maintenance of many different documents (e.g., contracts, requests for proposal (RFPs), requests for quotations (RFQs), requests for information (RFI), responses from vendors to various procurement-related requests, etc.). Furthermore, each of the procurement-related documents include underlying information or data (e.g., terms, conditions, quotations, fee schedules, discount schedules, statements of work, deliverable listings) that is to be processed and analyzed to effectively and efficiently manage the entity's supplier management processes. However, as described above, conventional approaches to managing procurement-related documents and data are both manually-intensive and time-consuming, which are prone to human error and large-scale inefficiencies.

Aspects and embodiments of the present disclosure address the above and other deficiencies by providing an automated document management system (herein referred to as a "document management system") and processes to ingest documents (e.g., electronic files), perform data extraction (data parsing and keyword identification) relating to the documents, categorize and map the extracted data, store the documents and extracted data in a database, and enable user-customizable queries of the database for the generating of search results and analytics. Advantageously, the document management system provides for the automated formation and management of a database of structured data corresponding to multiple different documents (e.g., procurement-related files such as contractual documentation (e.g., contracts, amendments, extensions, updates, etc.), RFPs, RFQs, RFIs, vendor responses to requests, schedules, etc.) for use in sourcing and vendor management, financial planning, analysis, budgeting, purchasing, and other supply chain management workflows.

According to embodiments, the document management system enables one or more user systems (e.g., a computing system operated by a user associated with an entity) to "upload" an electronic file including one or more procurement-related documents (herein referred to as a "document file"). According to embodiments, in an ingestion phase, the document management system receives an uploaded document file having a first format or file type (e.g., PDF, DOC, DOCX, etc.) via a user interface (e.g., a graphical user interface accessible by a user system), performs pre-processing operations relating to each ingested document file, and performs logging and tracking operations to generate a log of the ingested document files.

According to embodiments, in an extraction phase, the document management system parses the text of the document file into structured sections (e.g., headers, tables, key-pair fields, etc.), performs keyword identification to detect and extract a set of keywords associated with the document file, and conducts data cleanup operations to normalize the extracted data (e.g., deduplicate redundant entries, etc.). In an embodiment, the document management system executes one or more artificial intelligence (AI) models (herein the "keyword identification model(s)") to perform the keyword detection and extraction. According to embodiments, the keyword extraction model includes one or more pre-trained machine learning (ML) models, one or more deep learning models such as neural network graphs or models, one or more large language models (LLMs), etc.

According to embodiments, in a categorization phase, the document management system categorizes or maps the set of identified keywords associated with each document file to a selected category of a set of categories. In an embodiment, the document management system executes one or more AI models (herein referred to as the "classification model(s)") According to embodiments, in a database management phase, the document management system establishes a database (herein referred to as a "document data repository") having a data schema including a set of data structures representing the respective categories and mapped data corresponding to the document files. In an embodiment, the document management system includes an indexing service to index the mapped data stored in the database.

According to embodiments, in a query phase, the document management system enables user-customizable querying of the indexed data of the database and return query results and analytics. In an embodiment, the document management system may include one or more AI models (e.g., one or more large language models) trained to generate results in response to user-directed queries (herein referred to as the "query result generation model(s)"). In an embodiment, the document management system includes a user interface to receive the one or more queries of the document data from one or more user systems and provide the query results in response to the respective queries.

FIG. 1 is a block diagram of a computing environment including one or more user systems 50 communicatively coupled to a document management system 100 configured to perform operations relating to the management of documents and associated data, according to embodiments of the present disclosure. According to embodiments, the one or more user systems 50 may include any suitable computing device, including, for example, As used herein, the term "user" refers to one or more persons operating a computing device (e.g., user system 50) to submit (e.g., upload, transmit, send, etc.) one or more document files 52 to the document management system 100. According to embodiments, the user may initiate a query or search of the data stored and managed by the document management system 100 by entering an input query 152 via an interface associated with the document management system 100. According to embodiments, the file ingestion manager 110 may include one or more processing pipelines for handling document file uploads and asynchronous processing (e.g., Celery processing pipelines, Redis processing pipelines, etc.).

According to embodiments, the user systems 50 may be communicatively coupled to the document management system 100 via one or more suitable communication networks (not shown). Examples of such networks include the Internet, intranets, extranets, wide area networks (WANs), local area networks (LANs), wired networks, wireless networks, other suitable networks, or any combination of two or more such networks. In an embodiment, the document management system 100 may be communicatively coupled to the user systems 50 via any suitable interface or protocol, such as, for example, application programming interfaces (APIs), a web browser, JavaScript, etc.

As shown in FIG. 1, according to embodiments, the document management system 100 includes processing logic, computing modules, or computing engines corresponding to various functionality performed by the document management system 100. According to an embodiment, the document management system 100 includes processing logic representing a file ingestion manager 110, a data extraction manager 120, a data categorization manager 130, a data storage manager 140, and a query manager 150. According to embodiments, the example processing logic, computing modules, or computing engines are configured to perform operations, processes, steps, etc. to enable the functionality, as described in detail herein. As illustrated in FIG. 1, the document management system 100 includes one or more processing devices 160 operatively coupled to one or more memory devices 170 configured to execute and store instructions associated with the functionality of the various processing logic, computing components, services, engines, and computing modules of the document management system 100, as described in greater detail below in connection with FIGS. 2-7.

In some implementations, the document management system 100 may include one or more non-transitory, computer-readable storage media having computer-readable instructions thereon which, when executed by one or more processing devices, cause the one or more processing devices to perform operations described herein. The term "computer-readable storage medium" should be taken to include a single medium or multiple media that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. Processor-readable instructions or computer-readable instructions may include instructions to implement functionality corresponding to a document management system (e.g., the document management system of FIGS. 1-5).

According to one or more embodiments, the above-identified components or modules of the document management system 100 may be executed on one or more computer platforms of a system associated with an entity (e.g., a corporation) that are interconnected by one or more networks, which may include the Internet. The processing logic, components or modules of the document management system 100 may be, for example, a hardware component, circuitry, dedicated logic, programmable logic, microcode, etc., that may be implemented in the one or more processing devices 160 of the document management system 100 to perform the functionality described in detail herein.

In an embodiment, the file ingestion manager 110 of document management system 100 performs steps, operations, and functions associated with an ingestion phase of document management processes executed by the document management system 100. The file ingestion manager 110 receives or ingests the one or more document files 52 provided by the one or more user systems 50. The one or more document files 52 may be electronic file including a set of underlying document data. Example document files 52 include, but are not limited to, PDF files, DOC files, DOCX files, etc. The document files 52 may relate to an underlying document (e.g., a procurement-related document), such as, for example, a contract, a response to an RFP, a response to an RFQ, a response to an RFI, a legal instrument associated with two or more parties, etc. According to embodiments, the user system 50 may upload multiple document files 52 simultaneously, such that the file ingestion manager 110 performs the ingestion and pre-processing operation with respect to the multiple document files 52 concurrently.

In an embodiment, the document files 52 are provided (e.g., uploaded) by a user system 50 via an interface associated with the document management system 100. For example, a user of the user system 50 may "drag and drop" a document file 52 into a designated area or portion of an interface of the document management system 100. In an embodiment, the file ingestion manager 110 generates a user interface for receiving the uploaded document files 52 using interface generation functionality, such as Dash, React.js, etc. Upon receiving the document file 52, processing logic of the file ingestion manager 110 performs pre-processing and logging operations relating to the ingested document file 52, as shown in greater detail in FIG. 2.

Figure 2:
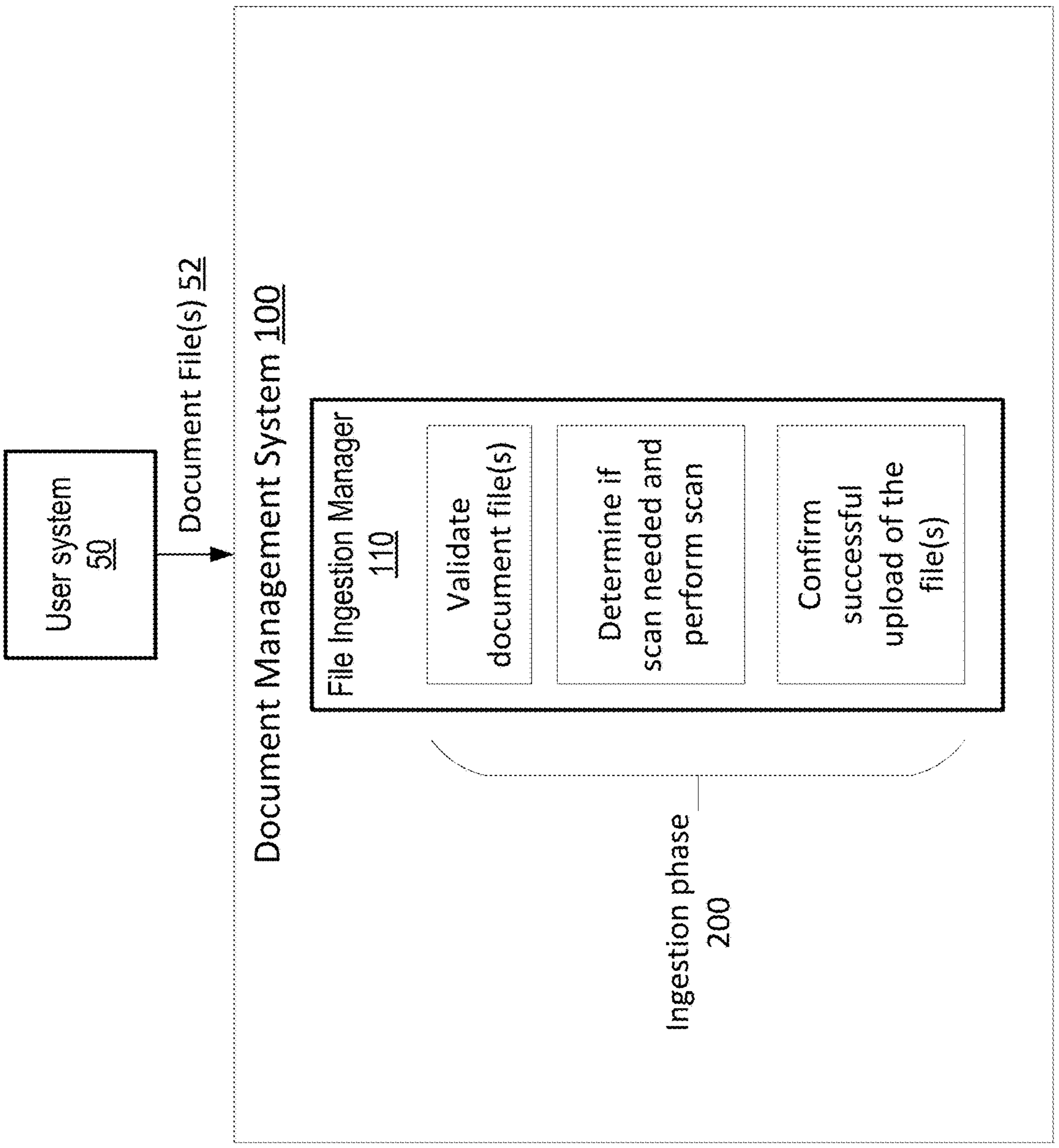
FIG. 2 depicts example file ingestion manager of a document management system performing operations during a document ingestion phase, according to one or more embodiments.

FIG. 2 illustrates an example file ingestion manager 110 receiving and ingesting one or more document files 52 provided by a user system 50. As shown in FIG. 2, during an ingestion phase 200, upon identification of the document file 52, the file ingestion manager 110 performs one or more pre-processing operations associated with the document file 52. In an example, the pre-processing operations include validating a file type and file size associated with the document file 52. In another example, the pre-processing operations include determine if an optical character recognition (OCR) scan is needed (e.g., if the document file 52 is a scanned or image-based document) and, if so, applying the OCR scan to the document file 52 (e.g., using Tesseract or Adobe SDK). In an embodiment, the file ingestion manager 110 may perform the OCR scan and extract raw text and structure data into one or more blocks (e.g., paragraphs, tables, headings, etc.). In another example, the file ingestion manager 110 may confirm that the one or more document files 52 have been successfully ingested by the 100. In an embodiment, the one or more operations of the ingestion phase 200 may be performed by the file ingestion manager 110 automatically initiate (e.g., without any specific or directed user action required) the operations associated with the ingestion phase 200. For example, in response to the user system 50 dragging and dropping the one or more document files 52 into a designated "upload" portion of a graphical user interface, the file ingestion manager 110 may automatically initiate execution of the operations of the ingestion phase 200 (i.e., without a specific instruction or action by the user system 50). In an embodiment, the file ingestion manager 110 may include processing logic to enable a retry of a failed ingestion (e.g., a failed uploading of a document file).

Figure 3:
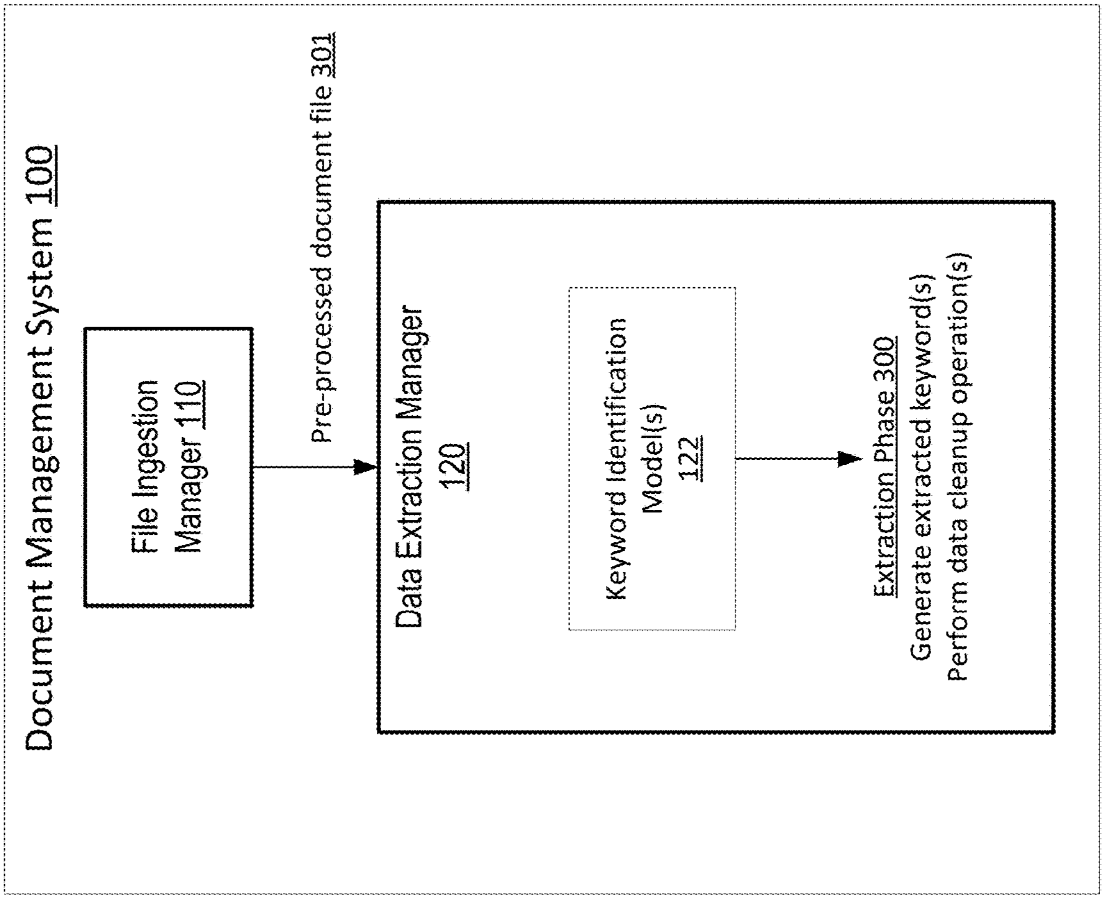
FIG. 3 depicts an example file ingestion manager and an example data extraction manager of a document management system performing operations during an extraction phase, according to one or more embodiments.

With reference to FIG. 3, the file ingestion manager 110 may provide a pre-processed document file 301 to the data extraction manager 120. The data extraction manager 120 receives the pre-processed document file 301 and performs one or more operations associated with an extraction phase 300. In the extraction phase 300, the data extraction manager 120 parses the text of the pre-processed document file 301 and performs keyword identification. In an embodiment, the data extraction manager 120 parses the text of the pre-processed document file 301 into a structured section. For example, the text may be parsed into one of the following example structured sections: a header section, a table section, or a key-pair field section. According to embodiments, the structured sections used during the parsing process may be selected or customized based on the type of document files that are processed by 100.

In an example where the document files are procurement-related documents (e.g., legal contracts relating to a supplier management workflow), the header sections (e.g., "Terms and Conditions"), the table sections (e.g., pricing and deliverable tables), and the key-pair field sections (e.g., "Vendor Identifier or Name: XYZ Corporation" may be employed to parse the text of the pre-processing document files 301 into respective sections.

According to embodiments, the data extraction manager 120 performs keyword identification processing to detect and extract a set of keywords from the pre-processed document file 301. According to an embodiment, the data extraction manager 120 may employ one or more AI models (keyword identification model(s)) to perform the keyword detection and extraction. According to embodiments, the keyword extraction model includes one or more pre-trained machine learning (ML) models to detect and extract one or more keywords. Example keywords include vendor names, pricing data, contractual milestones, etc. In addition, the keyword identification models may be trained to identify domain-specific keywords using a taxonomy dictionary (e.g., "SaaS", "Warranty", "Hourly Rate", etc.) According to an embodiment, the data extraction manager 120 may include a taxonomy dictionary that is provided, customized, updated, and managed on behalf of a user of the 100. key, one or more deep learning models such as neural network graphs or models, one or more large language models (LLMs), etc. In an embodiment, the data extraction manager 120 may perform fuzzy matching processing of the extracted data to match similar terms to one another (e.g., "Warranty" is matched to "Guarantee", etc.).

In at least one embodiment, the data extraction manager 120 can use one or more machine learning (ML) models to perform the keyword identification and extraction functions. There are several types of ML models (e.g., Hugging Face models, Scikit-learn models, etc.) that are commonly used to detect patterns in data. The ML model can be any type of model used to recognizing patterns, such as statistical models, neural networks, deep learning models, clustering algorithms, decision trees and random forests, regression models, classification models, or the like. The statistical models can include linear regression or logistic regression, which are used to identify relationships between variables and predict outcomes based on those relationships. Neural networks, which include layers of interconnected nodes, are models that are particularly effective for pattern recognition tasks. Recurrent Neural Networks (RNN) can be used for time series predictions. Deep Learning models are a subset of neural networks. Deep learning models have multiple layers that allow them to learn complex patterns in large datasets. Clustering algorithms, such as k-means and hierarchical clustering, group similar data points together based on their features. Decision Trees and Random Forests are used for classification and regression tasks. They work by splitting the data into subsets based on feature values and making predictions based on the majority class or average value in each subset. To detect patterns in data queries that include temporal ranges, there are several types of machine learning models, such as unsupervised or supervised behavior models, pattern recognition models, etc. Unsupervised behavior modules can be trained to monitor and detect patterns and anomalous patterns in user behavior. They can be fine-grained and unsupervised, making them suitable for analyzing temporal ranges in data queries. Pattern recognition models can be used for recognizing patterns in application database queries with scheduled pre-cached data retrieval. They can be particularly useful for detecting temporal patterns in data queries.

According to embodiments, during the extraction phase 300, the data extraction manager 120 can perform clean-up operations relating to the data of the pre-processed document file 301. For example, the data extraction manager 120 can normalize the extracted data in accordance with one or more rules or conditions (e.g., convert pricing-related data to a standard format). In an embodiment, the clean-up operations performed by the data extraction manager 120 can include deduplicating redundant entries within the extracted data (e.g., delete or remove repeated table rows).

According to embodiments, the data extraction manager 120 may perform one or more validation checks to ensure that extracted data fields are logically consistent in accordance with one or more extraction rules or conditions (e.g., the "price" data field is a numeric value, etc.). In an embodiment, the data extraction manager 120 may provide an interface to enable a user system to manually tag or edit uploaded document files.

As shown in FIG. 4, the data categorization manager 130 of the 100 includes processing logic to categorize or map the set of identified keywords of the extracted data associated with the one or more document files 52 into a related category. In an embodiment, the data categorization manager 130 includes one or more AI models (one or more classification models 132) trained using training documents (e.g., procurement-related documents, such as contracts) to identify category mappings for the set of identified keywords.

As shown in FIG. 4, during a classification phase 400, the data categorization manager 130 receives information associated with the set of extracted keywords from the data extraction manager 120. The data categorization manager 130 executes the one or more classification models 132 to classify each keyword into a corresponding category. For example, the categories may be defined in the classification models 132 and relate to a procurement-related workflow. Example categories may include a vendor category, a material category, a services category, a fixed cost category, a subscriptions-based contract category, a testing equipment category, etc. In an embodiment, the classification models 132 may include one or more machine-learning models that are trained using procurement-related documents to generate the mappings between the keywords and a corresponding category of a set of possible categories during the classification phase 400 (also referred to as "generated mappings").

In an embodiment, the classification models 132 develop and employ a taxonomy dictionary (e.g., a taxonomy dictionary relating to procurement or contract management) that maps the keywords to respective categories associated with a selected taxonomy. In an embodiment, the data categorization manager 130 may perform a multi-level hierarchical structure for multi-level classification. For example, the hierarchical structure may include a first level (Level 1) associated with a first set of categories (e.g., Vendor, Material, Services) and a second level (Level 2) associated with a second set of categories (e.g., Fixed Cost, Subscription-based). In an embodiment, the machine learning-driven mapping of keywords to categories may apply one or more rule-based override conditions for classifying a set of critical keywords. In an embodiment, the rule-based override conditions and the set of critical keywords may be customized and established within the one or more classification models 132. For example, the classification model 132 may be configured to execute a rule-based override condition that causes the "MoS" keyword to be mapped to the "Testing Equipment" category. In an embodiment, during the classification phase 400, the data categorization manager 130 can perform cross-reference operations to cross-reference existing document data repository entries to detect duplicates or related documents (e.g., related contracts).

With reference to FIG. 1, the data storage manager 140 of the 100 includes an index manager 142 configured to perform indexing services to manage a document data repository 144. As shown in FIG. 4, during the classification phase 400, the data categorization manager 130 provides the generated keyword-category mappings to the data storage manager 140. In an embodiment, the data storage manager 140 generates one or more data structures based on the mappings relating to the document files 52 in a document data repository 144. In an embodiment, the data storage manager 140 generates one or more data structures including a document table (e.g., a contracts table) including one or more of the following data fields: a document identifier, an upload date, a vendor name or identifier, pricing information, contract category, terms, deliverables, keywords). In an embodiment, the data storage manager 140 generates one or more data structures including a keyword table including one or more of the following data fields: a keyword, related document identifier(s), usage frequency, etc. In an embodiment, the data storage manager 140 generates one or more data structures including a mappings table including one or more of the following data fields: a category, related keywords, rules, overrides, conditions, etc.

According to embodiments, the data extraction manager 120 and the data categorization manager 130 may include processing logic to enable a feedback loop where a user system provides feedback (e.g., corrections, updates, etc.) into the one or more keyword identification models 122 to improve the keyword extraction and categorization process flows.

In an embodiment, during a database management phase, the index manager 142 of the data storage manager 140 receives the generated mappings and indexes keywords and document file metadata of the extracted data. In an embodiment, the index manager 142 indexes one or more key fields (e.g., vendor name, keywords) to enable querying via the query manager 150, as described in greater detail below. In an embodiment, the data storage manager 140 stores the document file metadata (e.g., original document file name, user-uploaded tags, etc.) in one or more data structures of the 144.

FIG. 4 illustrates an example data structure 410 generated by the data storage manager 140 and stored in the 144. As shown in FIG. 4, the data structure 410 includes document identifier fields, extracted keyword fields, category mapping fields, and index value fields. As shown in FIG. 4, the data structure includes an entry corresponding to Document 123 which is associated with a first set of extracted keywords mapped to a first set of categories (e.g., Keyword 1 is mapped to Category A, Keyword 2 is mapped to Category A . . . Keyword N is mapped to Category C). As shown in FIG. 4, the example data structure 410 includes information associated with a set of documents (e.g., Document 123, Document 456 . . . Document XYZ). According to embodiments, for each document, the data structure 410 includes an identified and extracted set of keywords, identified category mapping information for each keyword, and an index value associated with each keyword/category mapping.

According to embodiments, the index manager 142 can index key fields (e.g., vendor, keywords, etc.) and cause the index to be stored in 144 for efficient querying, as described in greater detail below with reference to FIG. 5. In an embodiment, the index manager 142 causes document file metadata (e.g., an original document file name, user-uploaded tags, etc.) to be stored in 144.

According to embodiments, the data storage manager 140 may be configured to perform automated processing of document files. For example, the data storage manager 140 may implement a schedule to automatically reprocess older document files (e.g., files that have a date that is before a threshold date) with updated taxonomy or models. In an embodiment, the data storage manager 140 may identify that one or more "critical" data fields associated with a document are missing or include improper values and generate a corresponding alert (e.g., a communication indicating that "no deliverables found in Document 123").

Figure 5:
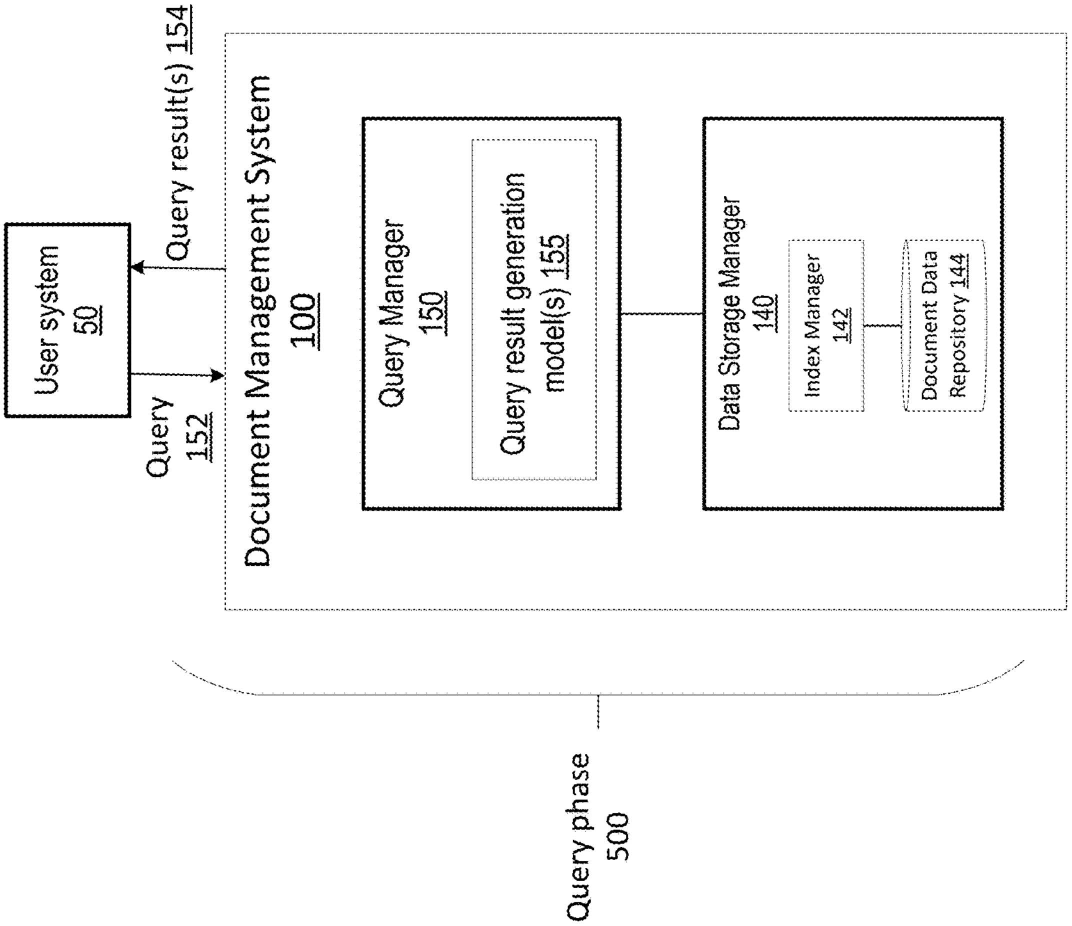
FIG. 5 depicts an example query manager of a document management system performing operations during a query phase, according to one or more embodiments.

FIG. 5 illustrates a query manager 150 of 100, according to embodiments. As shown in FIG. 5, during a query phase 500, the query manager 150 of the 100 receives a query 152 from a user system 50. The query manager 150 is operatively coupled to the data storage manager 140 and is configured to access the indexed document data stored in the document data repository 144 and use the document data to generate one or more query results 154 to be provided to the user system 50 (e.g., via a graphical user interface or other electronic communication). In an embodiment, the query manager 150 includes one or more AI models (query result generation model(s) 155) that are trained to process a query and generate a query result based on the indexed document data stored in the document data repository 144.

In an embodiment, the one or more query result generation models 155 include one or more LLMs (e.g., OpenAI API LLMs, LangChain LLMs, etc.) configured or tuned for domain-specific natural language query processing. For example, the query 152 received from the user system 50 may include a natural language query such as "Which vendors provide MOS testing equipment?". In another example, the query 152 received from the user system 50 may include a natural language query such as "Show contracts with fixed costs over $50,000." According to embodiments, the one or more query result generation models 155 may be configured to translate a natural language query into structured queries (e.g., a SQL query, a MongoDB query, etc.).

According to embodiments, the query manager 150 provides the user system 50 with an interface for receiving the query 152. In an embodiment, the interface generated by the query manager 150 may include one or more filters (e.g., keyword category, vendor name, vendor information, date range, pricing, etc.). According to embodiments, the query result generation models 155 are trained and tuned to interact with the data storage manager 140 to identify and retrieve relevant data from the document data repository in response to a query 152 received from a user system 50.

Advantageously, the query results 154 generated by the query manager 150 enable side-by-side comparisons documents (e.g., contracts), vendors, pricing terms, contractual terms and conditions, etc. In addition, the query manager 150 generates query results 154 that enable advanced analytics with regard to the procurement-related documents including the identification of trends (e.g., price fluctuations over time for specific vendors), clustering (e.g., grouping multiple contracts with similar terms), etc.

According to embodiments, the query results 154 may be outputted during the query phase 500 in any suitable format, such as via a user interface or dashboard (e.g., a dashboard displaying extracted data in a suitable format (e.g., one or more tables)). In an embodiment, the query results 154 may include one or more "links" to one or more related documents stored in the document data repository 144 to enable a user system to access particular documents (e.g., a specific contract associated with a query 152) or specific document data (e.g., a quote from a response to an RFP from Vendor ABC). According to embodiments, the query results 154 may be exported by the document management system 100 using one or more selected document formats (e.g., CSV files, JSON files, PDF files, etc.). In an embodiment, the query manager 150 may be configured to automatically generate communications or notifications (e.g., an email notification) with query results 154 (e.g., contract analytics, vendor comparison summaries, etc.). According to embodiments, the 144 may be configured in a suitable database format, such as PostgreSQL, MongoDB, etc.).

In an example, the query 152 may include a natural language input such as "Show contracts for MoS testing equipment with costs over $10,000". In this example, the document management system 100 extracts keywords "MoS", "Testing Equipment", and "Costs>$10,000". In an embodiment, the document management system 100 translates or converts the query 154 as follows:

SELECT: Vendor, Price, Terms
FROM: Contracts
WHERE: Keywords LIKE "%MOS%", AND Keywords LIKE "%Testing Equipment%" and PRICE greater than 10000.

In this example, the one or more query results generation models 152 generate and summarize query results in view of the above-identified converted query into an organized (e.g., readable) format, such as "3 vendors provide MoS testing equipment. Pricing starts at $12,000. Would you like a detailed comparison?".

Figure 6:
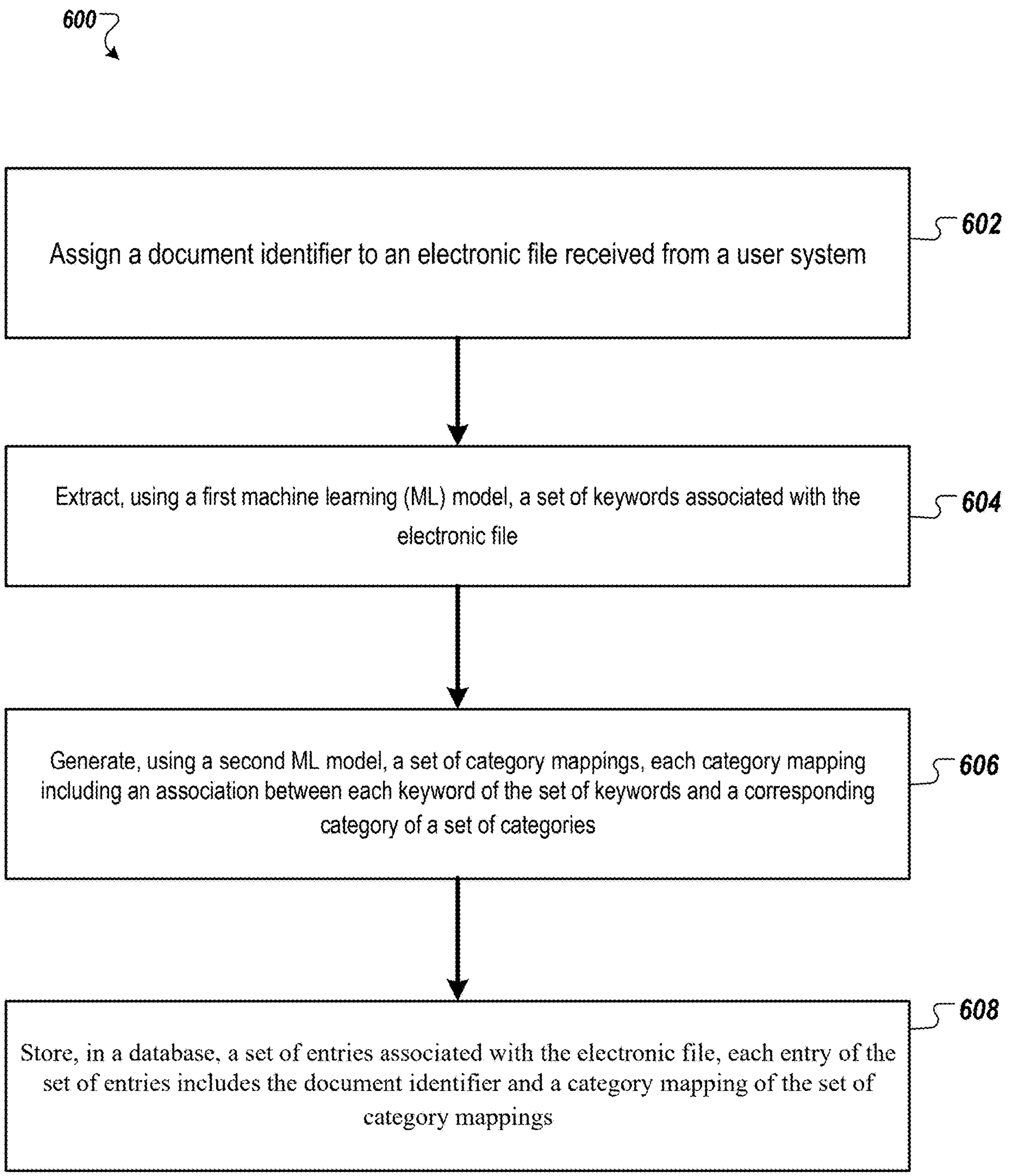
FIG. 6 is a flow diagram of a method for managing a database including data associated with one or more document files, according to one or more embodiments.

FIG. 6 is a flow diagram of a method 600 for managing a database including data extracted from one or more document files, according to one or more embodiments. The method 600 may be performed by processing logic of a document management system that may comprise hardware (e.g., circuitry, dedicated logic, programmable logic, microcode, etc.), software (e.g., instructions run on a processing device to perform hardware simulation), or a combination thereof. In one embodiment, the method 600 is performed by the document management system 100 of FIGS. 1-5. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 602, the processing logic of a document management system, assigns a document identifier to an electronic file received from a user system. In an embodiment, the electronic file relates to one or more documents, such as, for example procurement-related documents. In an embodiment, each document of an ingested electronic file (e.g., document file) is assigned a unique document identifier.

At operation 604, the processing logic extracts, using a first machine learning (ML) model, a set of keywords associated with the electronic file. In an embodiment, the set of keywords is extracted during an extraction phase (e.g., extraction phase 300 of FIG. 3). In an embodiment, the first ML model includes one or more pre-trained ML model configured to detect and extract the set of keywords defined by a taxonomy dictionary (e.g., a dictionary of terminology associated with a procurement workflow).

At operation 606, the processing logic generates, using a second ML model, a set of category mappings, each category mapping including an association between each keyword of the set of keywords and a corresponding category of a set of categories. In an embodiment, the processing logic executes the second ML model to map or associates each keyword that is extracted from the electronic file to a category of a set of categories. In an embodiment, the second ML model (e.g., one or more classification models 132 of FIG. 1) is trained to establish the category mappings for each ingested electronic file.

At operation 608, the processing logic stores, in a database, a set of entries associated with the electronic file, each entry of the set of entries includes the document identifier and a category mapping of the set of category mappings. In an embodiment, the processing logic includes an indexing service (e.g., index manager 142 of FIG. 1) to generate index values associated with respective entries stored in the database. Advantageously, the index values may be used to access the entries and associated data stored in the database in response to a query to generate a corresponding query result.

Figure 7:
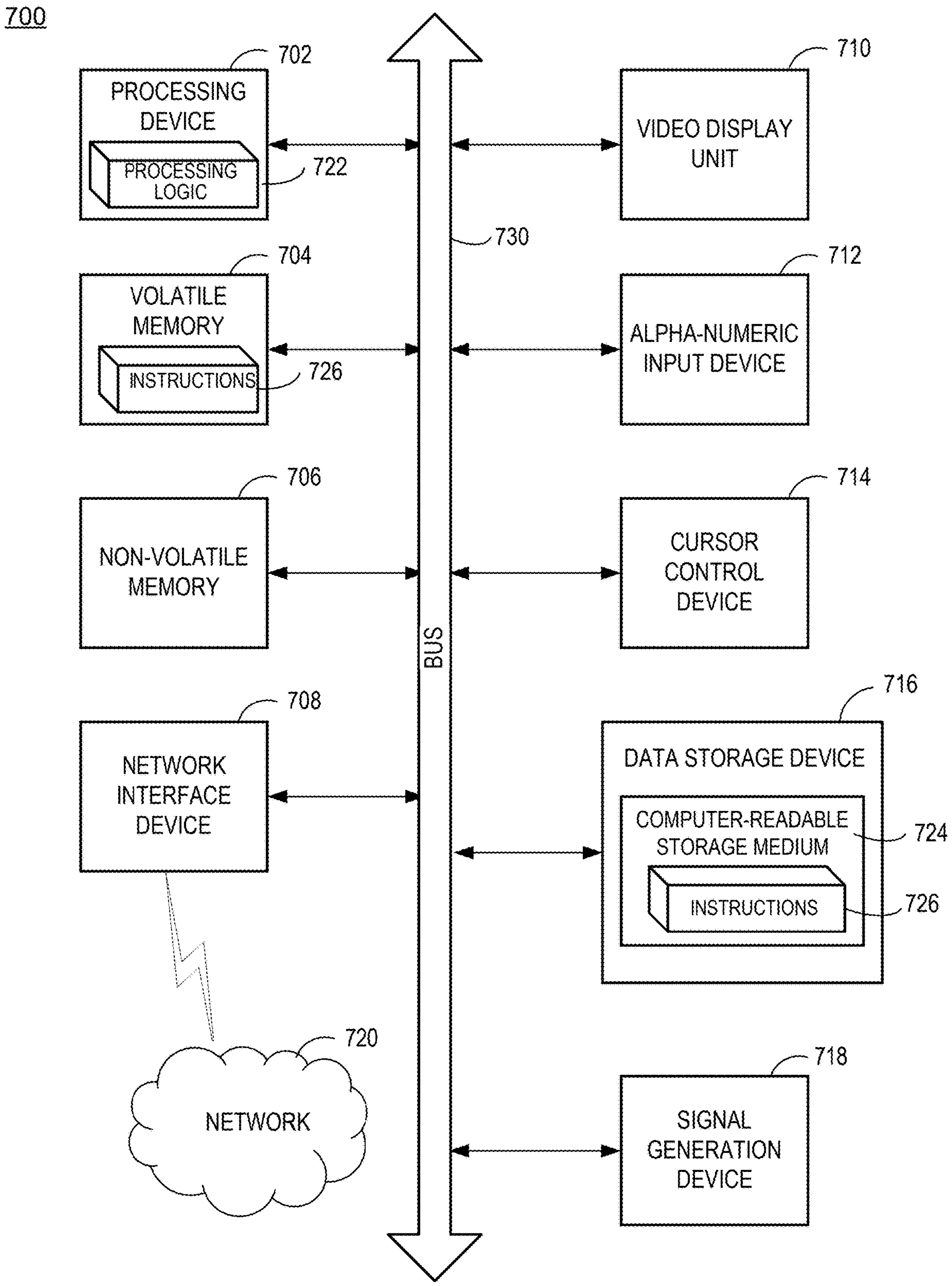
FIG. 7 illustrates a block diagram illustrating an exemplary computer device, in accordance with one or more implementations of the present disclosure.

FIG. 7 illustrates a block diagram illustrating an exemplary computer device 700 (or computing device), in accordance with implementations of the present disclosure. Computer device 700 can correspond to the document management system 100 (or device), as described above. Example computer device 700 can be connected to other computer devices in a LAN, an intranet, an extranet, and/or the Internet. Computer device 700 can operate in the capacity of a server in a client-server network environment. Computer device 700 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 700 can include a processing device 702 (also referred to as a processor, CPU, or GPU), a volatile memory 704 (or main memory, e.g., read-only memory (ROM), flash memory, dynamic random access memory (DRAM) such as synchronous DRAM (SDRAM), etc.), a non-volatile memory 706 (e.g., flash memory, static random access memory (SRAM), etc.), and a secondary memory (e.g., a data storage device 716), which can communicate with each other via a bus 730.

Processing device 702 (which can include processing logic 722) represents one or more general-purpose processing devices such as a microprocessor, central processing unit, or the like. According to embodiments, the processing logic 722 may be the logic associated with the document management system 100 of FIGS. 1-5. More particularly, processing device 702 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 can also be one or more special-purpose processing devices such as an ASIC, a FPGA, a digital signal processor (DSP), network processor, or the like. In accordance with one or more aspects of the present disclosure, processing device 702 can be configured to execute instructions performing the method disclosed herein.

Example computer device 700 can further comprise a network interface device 708, which can be communicatively coupled to a network 720. Example computer device 700 can further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 718 (e.g., a speaker).

Data storage device 716 can include a computer-readable storage medium (or, more specifically, a non-transitory computer-readable storage medium) 724 on which is stored one or more sets of executable instructions 726. In accordance with one or more aspects of the present disclosure, executable instructions 726 can comprise executable instructions performing the method disclosed herein (e.g., instructions executable by the document management system 100 of FIGS. 1-5.

Executable instructions 726 can also reside, completely or at least partially, within volatile memory 704 and/or within processing device 702 during execution thereof by example computer device 700, volatile memory 704 and processing device 702 also constituting computer-readable storage media. Executable instructions 726 can further be transmitted or received over a network via network interface device 708.

While the computer-readable storage medium 724 is shown in FIG. 7 as a single medium, the term "computer-readable storage medium" or "non-transitory computer-readable storage medium storing instructions" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general-purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

Other variations are within the scope of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A} , {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," "generating," "extracting," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, the terms "system" and "method" are used herein interchangeably as far as the system may embody one or more methods, and methods may be considered a system.

In the present document, references may be made to obtaining, acquiring, receiving, or inputting analog or digital data into a sub-system, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. A method comprising:

executing, by processing logic of a document management system, an ingestion phase comprising:

identifying an electronic file received from a user system via a graphical user interface, wherein the electronic file comprises a document;

validating a file type associated with the electronic file; and responsive to the validating, assigning a document identifier to the electronic file;

parsing the document into a set of structured sections comprising at least one of headers, tables, or key-pair fields;

extracting, by a first machine learning (ML) model using a procurement taxonomy dictionary, a set of keywords from the set of structured sections of the electronic file;

generating, using a second ML model trained on a set of procurement-related documents and the procurement taxonomy dictionary, a set of category mappings, each category mapping comprising an association between each keyword of the set of keywords and a corresponding category of a predefined set of procurement categories;

storing, in a database, a set of entries associated with the electronic file, each entry of the set of entries comprising the document identifier and a category mapping of the set of category mappings;

generating an index comprising the set of entries associated with the document;

processing, by a third ML model, a natural language query, wherein the third ML model translates the natural language query into a structured query configured to execute against the index, wherein each entry of the set of entries of the index comprises the document identifier and a category mapping of the set of category mappings; and generating, using the third ML model, a query result by executing the structured query against the index to retrieve at least a portion of the set of entries associated with the electronic file.

2. The method of claim 1, wherein the index comprises an index value for each entry of the set of entries.

3. The method of claim 1, further comprising receiving, via the graphical user interface, the electronic file from the user system.

4. The method of claim 1, further comprising:

assigning, by the processing logic of the document management system, a second document identifier to a second electronic file;

extracting, using the first machine learning (ML) model, a second set of keywords associated with the second electronic file;

generating, using the second ML model and the set of procurement categories, a second set of category mappings associated with the second electronic file; and storing, in the database, a second set of entries associated with the second electronic file, each entry of the second set of entries comprising the second document identifier and a category mapping of the second set of category mappings.

5. The method of claim 4, further comprising:

receiving, by the third ML model, an additional natural language query associated with the database; and generating, using the third ML model, an additional natural language query result in response to the additional natural language query, the additional natural language query result comprising at least a first portion of the set of entries associated with the electronic file and at least a second portion of the second set of entries associated with the second electronic file.

6. The method of claim 5, wherein the additional natural language query result comprises a side-by-side comparison of a first entry of the set of entries associated with the electronic file and a second entry of the second set of entries associated with the second electronic file.

7. One or more non-transitory, computer-readable storage media having computer-readable instructions thereon which, when executed by one or more processing devices, cause the one or more processing devices to perform operations comprising:

executing an ingestion phase comprising:

identifying an electronic file received from a user system via a graphical user interface, wherein the electronic file comprises a document;

validating a file type associated with the electronic file; and responsive to the validating, assigning a document identifier to the electronic file;

parsing the document into a set of structured sections comprising at least one of headers, tables, or key-pair fields;

extracting, by a first machine learning (ML) model using a procurement taxonomy dictionary, a set of keywords from the set of structured sections of the electronic file;

generating, using a second ML model trained on a set of procurement-related documents and the procurement taxonomy dictionary, a set of category mappings, each category mapping comprising an association between each keyword of the set of keywords and a corresponding category of a predefined set of procurement categories;

storing, in a database, a set of entries associated with the electronic file, each entry of the set of entries comprising the document identifier and a category mapping of the set of category mappings;

generating an index comprising the set of entries associated with the document;

processing, by a third ML model, a natural language query, wherein the third ML model translates the natural language query into a structured query configured to execute against the index, and wherein each entry of the set of entries of the index comprises the document identifier and a category mapping of the set of category mappings; and generating, using the third ML model, a query result by executing the structured query against the index to retrieve at least a portion of the set of entries associated with the electronic file.

8. The one or more non-transitory, computer-readable storage media of claim 7, wherein the index comprises an index value for each entry of the set of entries.

9. The one or more non-transitory, computer-readable storage media of claim 7, the operations further comprising receiving, via the graphical user interface, the electronic file from the user system.

10. The one or more non-transitory, computer-readable storage media of claim 7, the operations further comprising:

assigning a second document identifier to a second electronic file received from the user system;

extracting, using the first machine learning (ML) model, a second set of keywords associated with the second electronic file;

generating, using the second ML model and the set of procurement categories, a second set of category mappings associated with the second electronic file; and storing, in the database, a second set of entries associated with the second electronic file, each entry of the second set of entries comprising the second document identifier and a category mapping of the second set of category mappings.

11. The one or more non-transitory, computer-readable storage media of claim 10, the operations further comprising:

receiving, by the third ML model, an additional natural language query associated with the database; and generating, using the third ML model, an additional natural language query result in response to the additional natural language query, the additional natural language query result comprising at least a first portion of the set of entries associated with the electronic file and at least a second portion of the second set of entries associated with the second electronic file.

12. The one or more non-transitory, computer-readable storage media of claim 11, wherein the additional natural language query result comprises a side-by-side comparison of a first entry of the set of entries associated with the electronic file and a second entry of the second set of entries associated with the second electronic file.

13. A computing system comprising:

one or more processors; and one or more memories storing instructions that, when executed by the one or more processors, cause the one or more processors to perform operations comprising:

executing an ingestion phase comprising:

identifying an electronic file received from a user system via a graphical user interface, wherein the electronic file comprises a document;

validating a file type associated with the electronic file; and responsive to the validating, assigning a document identifier to the electronic file;

parsing the document into a set of structured sections comprising at least one of headers, tables, or key-pair fields;

extracting, by a first machine learning (ML) model using a procurement taxonomy dictionary, a set of keywords from the set of structured sections of the electronic file;

generating, using a second ML model trained on a set of procurement-related documents and the procurement taxonomy dictionary, a set of category mappings, each category mapping comprising an association between each keyword of the set of keywords and a corresponding category of a predefined set of procurement categories;

storing, in a database, a set of entries associated with the electronic file, each entry of the set of entries comprising the document identifier and a category mapping of the set of category mappings;

generating an index comprising the set of entries associated with the document;

processing, by a third ML model, a natural language query, wherein the third ML model translates the natural language query into a structured query configured to execute against the index, and wherein each entry of the set of entries of the index comprises the document identifier and a category mapping of the set of category mappings; and generating, using the third ML model, a query result by executing the structured query against the index to retrieve at least a portion of the set of entries associated with the electronic file.

14. The computing system of claim 13, wherein the index comprises an index value for each entry of the set of entries.

15. The computing system of claim 13, the operations further comprising:

assigning a second document identifier to a second electronic file received from the user system;

extracting, using the first machine learning (ML) model, a second set of keywords associated with the second electronic file;

generating, using the second ML model and the set of procurement categories, a second set of category mappings associated with the second electronic file; and storing, in the database, a second set of entries associated with the second electronic file, each entry of the second set of entries comprising the second document identifier and a category mapping of the second set of category mappings.

16. The computing system of claim 15, the operations further comprising:

receiving, by the third ML model, an additional natural language query associated with the database; and generating, using the third ML model, an additional natural language query result in response to the additional natural language query, the additional natural language query result comprising at least a first portion of the set of entries associated with the electronic file and at least a second portion of the second set of entries associated with the second electronic file.

17. The computing system of claim 16, wherein the additional natural language query result comprises a side-by-side comparison of a first entry of the set of entries associated with the electronic file and a second entry of the second set of entries associated with the second electronic file.

* * * * *